(12) United States Patent  (10) Patent No.: US 11,173,990 B2
Emery et al.  (45) Date of Patent: Nov. 16, 2021

(54) FLOATING SUPPORT STRUCTURE COMPRISING A FLOATER AND A HEAVE PLATE WITH SECTION VARYING WITH DEPTH

(71) Applicant: IFP Energies nouvelles, Rueil-Malmaison (FR)

(72) Inventors: Adrien Emery, Rueil Malmaison (FR); Pauline Bozonnet, Lyons (FR); Navid Saeedi, Alfortville (FR); Victor Dupin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 480 days.

(21) Appl. No.: 16/319,599

(22) PCT Filed: Jul. 4, 2017

(86) PCT No.: PCT/EP2017/066666
§ 371 (c)(1),
(2) Date: Jan. 22, 2019

(87) PCT Pub. No.: WO2018/019525
PCT Pub. Date: Feb. 1, 2018

(65) Prior Publication Data
US 2021/0284295 A1 Sep. 16, 2021

(30) Foreign Application Priority Data

Jul. 26, 2016 (FR) ........................................ 1657171

(51) Int. Cl.
*B63B 35/44* (2006.01)
*B63B 5/18* (2006.01)
*B63B 39/06* (2006.01)

(52) U.S. Cl.
CPC ............... *B63B 35/44* (2013.01); *B63B 5/18* (2013.01); *B63B 39/06* (2013.01); *B63B 2035/446* (2013.01); *B63B 2039/067* (2013.01)

(58) Field of Classification Search
CPC .......... B63B 35/00; B63B 35/44; B63B 5/00; B63B 5/18; B63B 39/00; B63B 39/02;
(Continued)

(56) References Cited

U.S. PATENT DOCUMENTS 7,037,044 B2 * 5/2006 Xu ..................... B63B 35/4413
114/264
7,900,572 B2 * 3/2011 Leverette ............ B63B 35/4413
114/264

(Continued)

FOREIGN PATENT DOCUMENTS

| CN | 101774424 A | 7/2010 |
| CN | 204110335 U | 1/2015 |

(Continued)

OTHER PUBLICATIONS

JP Application No. 2019-503990 First Office Action, dated Apr. 28, 2021, 7 pages.

(Continued)

*Primary Examiner* — Lars A Olson
(74) *Attorney, Agent, or Firm* — Fitch, Even, Tabin & Flannery LLP

(57) ABSTRACT

The present invention relates to a floating support structure (1) provided with a main floater (2) and with a heave plate (3). Heave plate (3) comprises a section varying with depth. Furthermore, heave plate (3) has a minimum horizontal section Sd1 greater than horizontal section Sc of main floater (2).

23 Claims, 2 Drawing Sheets

(58) Field of Classification Search
CPC ............ B63B 39/06; B63B 2035/446; B63B 2039/067
USPC .......................................... 114/121, 122, 264
See application file for complete search history.

(56) References Cited

U.S. PATENT DOCUMENTS

| | | | |
|---|---|---|---|
| 8,291,849 B2* | 10/2012 | Leverette | B63B 35/4413 114/264 |
| 8,418,640 B2* | 4/2013 | Leverette | B63B 35/4413 114/264 |
| 9,802,683 B2* | 10/2017 | Huang | B63B 35/4413 |
| 10,569,844 B2* | 2/2020 | Gilloteaux | B63B 35/44 |
| 10,774,813 B2* | 9/2020 | Fernandez Gomez | B63B 35/44 |
| 2016/0101833 A1 | 4/2016 | Gilloteaux et al. | |

FOREIGN PATENT DOCUMENTS

| | | |
|---|---|---|
| CN | 104943827 A | 9/2015 |
| DE | 1756091 A1 | 4/1970 |
| EP | 1719697 A1 | 11/2006 |
| FR | 3005698 A1 | 11/2014 |
| JP | 2008-062677 A | 3/2008 |
| JP | 2008074297 | 4/2008 |
| JP | 2008074297 A | 4/2008 |
| WO | 2014/184454 A1 | 11/2014 |

OTHER PUBLICATIONS

Thiagarajan, K., et al., "Influence of Heave Plate Geometry on the Heave Response of Classic Spars", Proceedings of OMAE '02, 21st International Conference on Offshore Mechanics and Artic Engineering, Jun. 23-28, 2002, Oslo, Norway, 7 pages.

Wu, W. et al., "Research on Hydrodynamic Characteristics of Forced Oscillation of Heave Plate of Spar Platform", Ship Mechanics, Feb. 2009, 8 pages.

Liu J., "Hydrodynamic Analysis and Design of Heave Damping Plates", China Excellent Master's Paper Database-Basic Science, pp. 6-10, Oct. 2014.

CN Application No. 201780046374.9, First Office Action, dated Jun. 19, 2020, 42 pages.

CN Application No. 201780046374.9, Second Office Action, dated Dec. 17, 2020, 31 pages.

International Search Report for PCT/EP2017/066666, dated Sep. 4, 2017; English translation submitted herewith (5 pgs.).

Japanese Office Action Appeal No. 2019-503990, dated May 11, 2021 and translation, 7 pages.

* cited by examiner

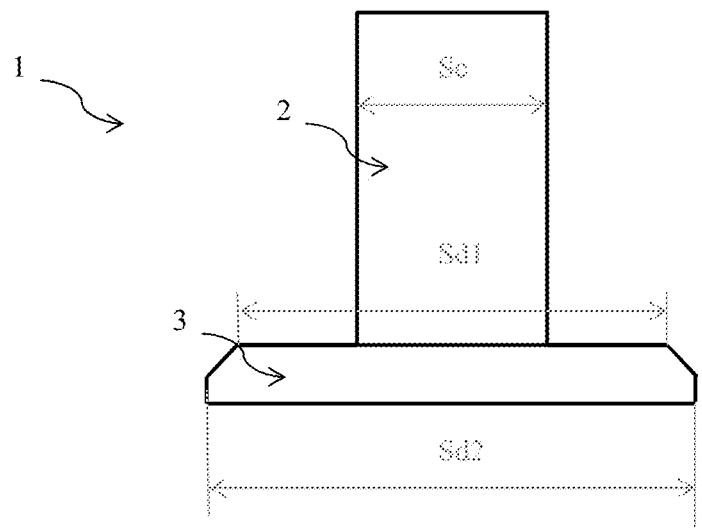
Figure 1
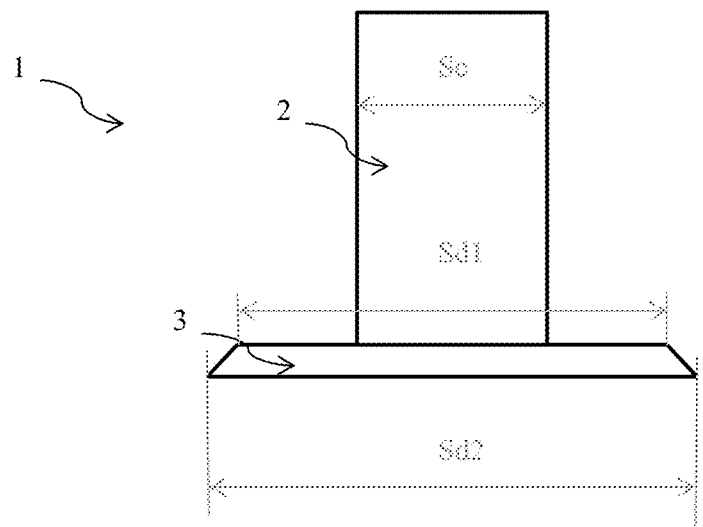
Figure 2
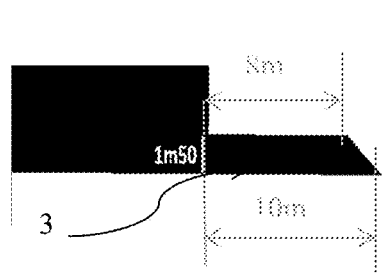 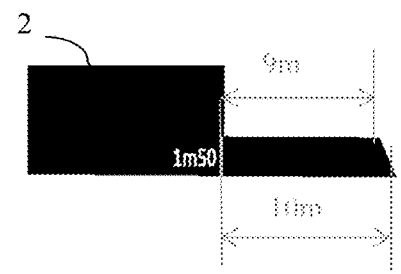 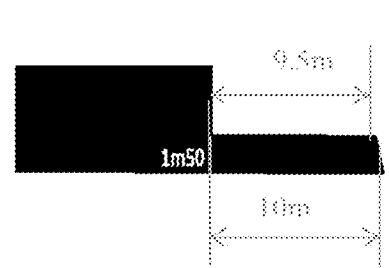
Figure 3a  Figure 3b  Figure 3c

FLOATING SUPPORT STRUCTURE COMPRISING A FLOATER AND A HEAVE PLATE WITH SECTION VARYING WITH DEPTH

CROSS REFERENCE TO RELATED APPLICATIONS

Reference is made to PCT/EP2017/066666 filed Jul. 4, 2017, and French Application No. 16/57.171 filed Jul. 26, 2016, which are incorporated herein by reference in their entirety.

BACKGROUND OF THE INVENTION

Field of the Invention

The present invention relates to offshore floating support structures, in particular for offshore wind turbines.

Description of the Prior Art

In the case of offshore wind turbines, the floating support structure supports, in the emerged part, the wind turbine made up of the blades, the rotor, the nacelle and the tower fastened onto the floating support. These floating support structures can be anchored to the seabed by taut, semi-taut or catenary anchor lines. The goal of the floating support is to provide wind turbine buoyancy and stability to take up the stresses exerted thereon while limiting motion of the assembly.

Various floating support structures intended for installing offshore multi-megawatt wind turbines are currently under development in many countries. Depending on the depth of the site being considered, several design options are possible. Despite their great diversity, several floating support structure families emerge, among which:

SPAR (Single Point Anchor Reservoir) type floaters, characterized by a slender geometric shape and comprising significant ballast to lower the center of gravity of the whole structure to the maximum and thus to provide stability (referred to as mass stability), barge type floaters are very wide shallow drafted support structures. Their stability is provided by their wide waterplane area (referred to as form stability). However, this type of support structure is very sensitive to wave motion, TLP (Tension Leg Platform) type support structures that have the specific feature of being moored to the seabed by taut cables providing structure stability, semi-submersible type floaters are support structures having at least three floaters connected by arms providing stiffness. These support structures generally have a low displacement and a great waterplane area inertia, thus providing sufficient righting moment for the stability thereof. Furthermore, this type of floater is less sensitive to wave motion than barges.

For all the floating support families, the main design criteria are stability, counter-balancing of the thrust caused by the wind force and limitation of the floating support motion.

In order to ensure stability and small floating support, one solution is using a heave plate, also referred to as damper plate or skirt, at the floater of the floating support structure. The heave plate projects from the floater to damp notably heave, as well as roll and pitch motions of the floating support.

French Patent application 3,005,698 (WO-2014/184,454) describes such an example of a floating support provided with a heave plate for a floating support structure for an offshore wind turbine. The main drawback of the heave plates described in FIGS. 4 and 5 of this patent application is that they are not sufficiently resistant due to their small thickness and to their specific shape (low angle formed between the parts of the heave plate).

SUMMARY OF THE INVENTION

To overcome these drawbacks, the present invention relates to a floating support provided with a main floater and having a heave plate. The heave plate comprises a section varying with depth which is efficient from a hydrodynamic point of view. Furthermore, the heave plate has a minimum horizontal section greater than the horizontal section of the main floater which guarantees heave plate resistance.

The present invention relates to a floating support structure comprising at least one main floater and at least one heave plate. The surface area of the horizontal section of the heave plate is greater than surface area Sc of the horizontal section of the main floater, with the heave plate being fastened to the main floater. The heave plate comprises at least one part having a horizontal section varying with depth with a minimum surface area Sd1 of the horizontal section of the heave plate is strictly greater than the surface area Sc of the horizontal section of the main floater.

According to one embodiment of the invention, the span of the heave plate ranges between 1 and 15 m and is preferably between 3 and 10 m.

Advantageously, the heave plate comprises at least one truncated cone shape.

Preferably, the half angle at the apex of the cone of the truncated cone shape ranges between 15° and 60°.

According to an embodiment, the thickness of the heave plate at the main floater periphery is at least 1.5 m.

According to an aspect, the heave plate comprises a plurality of at least one of notches and projections evenly distributed over the periphery thereof.

Advantageously, the at least one of notches and the projections are substantially rectangular.

According to an implementation option, the heave plate comprises a leaf in the lower part thereof.

According to one feature, the heave plate is fastened to the base of the main floater.

According to a design, the heave plate comprises a horizontal section increasing with depth.

According to an alternative, the heave plate comprises a horizontal section decreasing with depth.

Alternatively, the heave plate comprises a horizontal section increasing, then decreasing with depth.

Advantageously, the heave plate is made of steel or concrete.

According to an embodiment of the invention, the heave plate comprises a substantially circular, hexagonal or square horizontal section.

Furthermore, the invention relates to an offshore wind turbine comprising a wind turbine and a floating support structure according to one of the aforementioned features.

BRIEF DESCRIPTION OF THE DRAWINGS

Other features and advantages of the device according to the invention will be clear from reading the description hereafter of embodiments given by way of non-limitative example, with reference to the accompanying figures wherein:

FIG. 1 illustrates a floating support structure according to a first embodiment of the invention;

FIG. 2 illustrates a floating support structure according to a second embodiment of the invention;

FIGS. 3a to 3c illustrate three heave plate dimensioning examples according to the second embodiment of the invention;

DETAILED DESCRIPTION OF THE INVENTION

Figure 4:
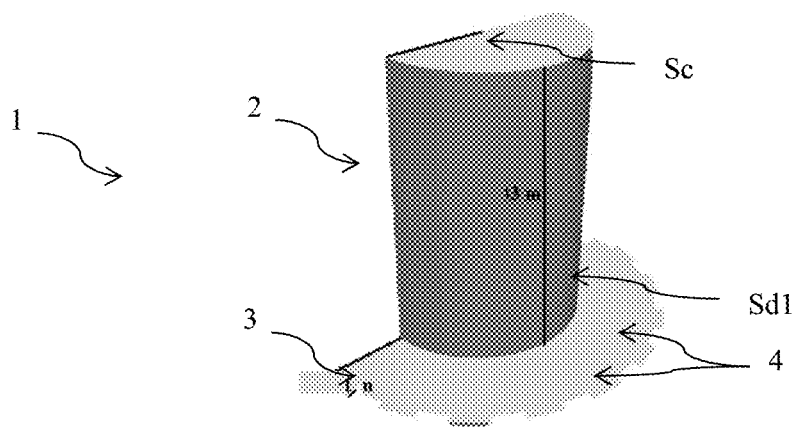
FIG. 4 illustrates a floating support structure according to a third embodiment of the invention.

The present invention relates to a floating support structure. The floating support structure can be used as a foundation for an offshore wind turbine, but it is also suited to other fields such as offshore oil recovery and ocean energy recovery (thermal energy, wave energy, current energy, etc.).

The floating support structure can belong to the family of SPAR type, barge type, TLP type or semi-submersible type (of tri-floater type for example) floaters.

The floating support structure comprises at least one main floater and at least one heave plate. The main floater provides floating support buoyancy. The floating support structure can comprise one or more main floaters connected to one another. The main floater can have, by way of non limitative example, a substantially elongate shape: the height (along the vertical axis under normal conditions of use of the floating support) can be equivalent to or greater than the other horizontal dimensions of the main floater. The main floater can have any shape, notably a parallelepipedic, cylindrical, prismatic, conical, truncated, etc., shape. The surface area of the horizontal section of the main floater is denoted by Sc. The horizontal section is understood to be the section of the main floater (or of the heave plate) cut by a horizontal plane, when the floating support is in a "normal" position of use, for example without wind thrust. For one embodiment example where the main floater has a cylindrical shape, the horizontal section is circular. The main floater can be made of steel or concrete. In order to provide buoyancy, the main floater can comprise an inner volume filled with air.

According to the invention, the heave plate is fastened to the main floater. The heave plate has a small thickness (height along the vertical axis when the floater is in "normal" position) in relation to the other dimensions of the plate, depending on the position of use of the floating support structure. According to the invention, the heave plate has a horizontal section varying with depth. Thus, the heave plate comprises a thickness variation with depth. Furthermore, the heave plate has a minimum surface area of the horizontal section, denoted by Sd1, strictly greater than surface area Sc of the horizontal section of the main floater. Thus, only the periphery of the heave plate is variable with depth and the periphery of the heave plate has an edge of reduced thickness. This thickness variation with a minimum surface area provides a structurally resistant heave plate with a fine end favoring hydrodynamic damping.

The heave plate can be made of concrete or metal, notably steel. The heave plate can comprise reinforcements linking the main floater to the heave plate. These reinforcements can be used notably when the heave plate is made of metal. These reinforcements can be perpendicular to the plate and have a thickness varying with depth.

The various embodiments described below can be combined to combine their effects.

According to one embodiment of the invention, the heave plate can be fastened to the base of the main floater. This construction enables simple design of the floating support structure while providing good damping of the floating support.

Alternatively, the heave plate can be fastened to any point of the main floater.

According to an implementation option, the floating support structure comprises a single heave plate. This construction allows the design of the floating support to be accomplished.

Alternatively, the floating support structure can comprise a plurality of heave plates fastened at different heights of the main floater to optimize damping of the floating support.

According to an embodiment, the heave plate has a horizontal section whose shape is identical to the horizontal section of the main floater, with greater dimensions. In other words, the horizontal section of the heave plate can be a homothety of the horizontal section of the main floater. For example, if the main floater is cylindrical, the horizontal section of the heave plate can be circular. According to another example, if the main floater is parallelepipedic, the horizontal section of the heave plate can be rectangular. According to a third example, if the main floater has a hexagonal section, the horizontal section of the heave plate can be hexagonal.

According to an alternative, the shape of the heave plate can be different from the shape of the main floater. For example, the main floater can have a substantially cylindrical shape and the heave plate a polygonal shape, hexagonal for example, and conversely.

According to an embodiment of the invention, the main floater and the heave plate are centered in relation to one another.

Furthermore, if the floating support structure is of multi-floater type, tri-floater for example, a heave plate can be provided at the base of each floater, of the three floaters for example.

According to an embodiment of the invention, the variation with depth of the heave plate horizontal section can be continuous over the entire height of the heave plate and linear. The heave plate can then have at least a substantially truncated cone shape. According to an alternative, the variation with depth of the heave plate horizontal section can be continuous over the entire height of the heave plate but not linear, for example concave, convex, etc. Alternatively, the section can be variable over a certain height, then the section can be constant. According to a design, the heave plate can have a step-like variation (i.e. a stack of several plates of different dimensions).

According to a design of the invention, the heave plate has at least a truncated cone-shaped part which forms the horizontal section variation of the heave plate.

According to an embodiment of the invention, the heave plate can have a horizontal section increasing with depth. Thus, in the position of use of the floating support structure, the heave plate has a greater section at the base thereof and a smaller section at the top thereof. The heave plate thus gets thinner with depth (decreasing thickness). This increase in the horizontal section of the heave plate allows a hydrodynamic shape to be generated, which favors heave, roll and pitch damping. This construction affords the advantage of easy implementation.

In a variant, the heave plate can have a horizontal section decreasing with depth. Thus, in the position of use of the floating support structure, the heave plate has a greater section at the top thereof and a smaller base. The heave plate thus gets thinner at the top thereof (decreasing thickness). This decrease in the horizontal section of the heave plate allows a hydrodynamic shape to be generated, which favors heave, roll and pitch damping.

Alternatively, the shape of the heave plate can have two truncated cone-shaped volumes whose sections of greater surface area are juxtaposed at the center thereof. The two truncated volumes preferably have identical dimensions. Thus, the horizontal section of the heave plate increases with depth over a first height (corresponding to the upper part of the heave plate), then it decreases with depth over a second height (corresponding to the lower part of the heave plate). Thus, the heave plate has a greater section at the center thereof and smaller sections at the base and the top thereof. This heave plate design allows a hydrodynamic shape to be generated, which favors heave, roll and pitch damping.

According to an embodiment of the invention, in order to ensure good resistance of the floating support structure, the span of the heave plate can range between 1 and 15 m and preferably between 3 and 10 m. The span of the heave plate is understood to be the minimum distance between the peripheral end of the main floater and the peripheral end of the heave plate. For example, if the main floater and the heave plate are cylindrical, the span corresponds to the radius difference between the main floater and the heave plate. According to another example, if the main floater and the heave plate have a square section, the span corresponds to half the side difference between the main floater and the heave plate. Such a span guarantees minimum dimensions for the heave plate in relation to the dimensions of the main floater, which allows the resistance thereof to be increased. For structural reasons, the skirt span is limited to 12 m or even 10 m if the radius of the main cylinder itself is great (typically 12 m).

According to an embodiment of the invention, on the periphery of the heave plate, the thickness of the heave plate can be as small as possible, preferably below 1 m, and more preferably below 0.5 m. This small thickness favors damping of the floating support structure.

According to a non limitative implementation example, at the root end of the heave plate, a thickness of the heave plate, or possibly of the reinforcements, can be greater than or equal to 1.5 m. In other words, according to an example, the thickness of the heave plate at the periphery of the main floater can be greater than or equal to 1.5 m. This thickness of the heave plate root end guarantees optimized resistance of the heave plate.

For the embodiment where the heave plate has a substantially truncated cone shape, the half angle at the apex of the cone of the truncated cone shape can range between 15° and 60°. Thus, the heave plate hydrodynamics is optimized.

According to an implementation option, the heave plate can comprise at least one of a plurality of notches and projections evenly distributed over the periphery thereof. It is thus possible to increase the circumference of the heave plate, which has the effect of increasing the area where vortex shedding occurs, without however increasing the surface area of the heave plate. The at least one of notches and the projections can have any shape, notably rectangular, semi-circular, sinusoidal, etc. The notches can be provided notably through machining of the heave plate.

According to an embodiment of the invention, the heave plate can comprise a leaf, preferably metallic, and more preferably made of steel, projecting from the base of the heave plate. A leaf is understood to be a thin sheet of a material that projects over the entire periphery of the heave plate. The thickness of the leaf can range between 1 and 20 cm, and it can be substantially 5 cm. This leaf provides a sufficiently thick heave plate which provides structural resistance and has a very thin small end to optimize damping.

According to a non limitative implementation example, the leaf can have a length (between the end of the heave plate and the end of the leaf) of 0.5 m, a thickness of 5 cm, for a main floater with a radius of 12 m and a heave plate with a maximum radius of 21.5 m.

According to a design, the floating support structure can comprise a permanent ballast. The permanent ballasts can be arranged at the base of the main floater, for example above the heave plate. The permanent ballast allows hydrostatic equilibrium of the floating support structure. It can be concrete, sea water or any heavy solid or liquid matter. The mass of these various materials can be distributed to meet both static and dynamic stability criteria, and also to decrease the manufacturing cost of the floating support structure.

According to a feature, the floating support structure can comprise at least one and preferably more dynamic ballast caissons having a volume that can be ballasted or deballasted depending on the conditions of use of the floating support structure. The ballast used in these caissons can notably be sea water. These dynamic ballast caissons can be included in the main floater such as for example above the heave plate, and possibly above the permanent ballast. The dynamic ballast caissons allow correction and adjustment of the trim angle of the floating support structure, and therefore the axis of the system on the floating support structure. The dynamic ballast caissons can be provided within the main floater in a peripheral part thereof.

FIG. 1 schematically illustrates, by way of non limitative example, a floating support structure according to a first embodiment of the invention. Floating support structure 1 comprises a substantially cylindrical main floater 2 of horizontal section Sc. Floating support structure 1 also comprises a heave plate 3 fastened to the base of main floater 2. Heave plate 3 has a horizontal section that is always greater than the horizontal section of the main floater. Heave plate 3 has an upper part with a substantially truncated cone shape. The horizontal section increases in a continuous and linear manner between minimum horizontal section Sd1 and maximum horizontal section Sd2. Heave plate 3 has a substantially cylindrical lower part: its horizontal section is constant with a section Sd2.

FIG. 2 schematically illustrates, by way of non limitative example, a floating support structure according to a second embodiment of the invention. Floating support structure 1 comprises a substantially cylindrical main floater 2 of horizontal section Sc. Floating support structure 1 also comprises a heave plate 3 fastened to the base of main floater 2. Heave plate 3 has a horizontal section which is always greater than the horizontal section of the main floater. Heave plate 3 has a substantially truncated cone shape while the horizontal section increases in a continuous and linear manner between minimum horizontal section Sd1 and maximum horizontal section Sd2.

FIGS. 3a to 3c schematically illustrate, by way of non limitative example, three heave plate dimensions for the second embodiment of the invention. FIGS. 3a to 3c are half sectional views of the floating support structure.

For the variant of FIG. 3a, the height of heave plate 3 is 1.50 m while the minimum distance (in a horizontal plane, for the minimum surface area of the horizontal section) between main floater 2 and the periphery of heave plate 3 is 8 m, and the maximum distance (in a horizontal plane, for the maximum surface area of the horizontal section) between main floater 2 and the periphery of heave plate 3 is 10 m. The maximum distance corresponds to the span of the heave plate.

For the variant of FIG. 3b, the height of heave plate 3 is 1.50 m which is the minimum distance (in a horizontal plane, for the minimum surface area of the horizontal section) between main floater 2 and the periphery of heave plate 3 is 9 m, and the maximum distance (in a horizontal plane, for the minimum surface area of the horizontal section) between main floater 2 and the periphery of heave plate 3 is 10 m. The maximum distance corresponds to the span of the heave plate.

For the variant of FIG. 3c, the height of heave plate 3 is 1.50 m while the minimum distance (in a horizontal plane, for the minimum surface area of the horizontal section) between main floater 2 and the periphery of heave plate 3 is 9.5 m, and the maximum distance (in a horizontal plane, for the minimum surface area of the horizontal section) between main floater 2 and the periphery of heave plate 3 is 10 m. The maximum distance corresponds to the span of the heave plate.

FIG. 4 schematically illustrates, by way of non limitative example, a floating support structure according to a third embodiment. FIG. 4 is a three-dimensional view of half a floating support structure. Floating support 1 comprises a substantially cylindrical main floater 2 of horizontal section Sc. Floating support 1 also comprises a heave plate 3 fastened to the base of main floater 2. The thickness of the heave plate is not shown in this figure. Heave plate 3 has a horizontal section which is always greater than the horizontal section of the main floater. Heave plate 3 has a substantially truncated cone shape (not shown) with the horizontal section increasing in a continuous and linear manner between minimum horizontal section Sd1 and the maximum horizontal section (not shown). Moreover, heave plate 3 comprises a plurality of notches 4 provided on the periphery of heave plate 3. Notches 4 are evenly distributed on this periphery. The notches substantially have a rectangular shape. Heave plate 3 can comprise between 5 and 30 notches.

Figure 5:
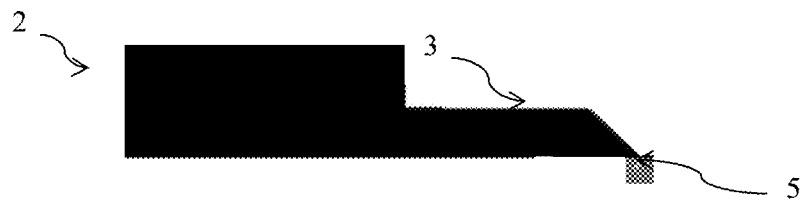
FIG. 5 illustrates a floating support structure according to a fourth embodiment of the invention.

FIG. 5 schematically illustrates, by way of non limitative example, a floating support structure according to a fourth embodiment. FIG. 5 is a half sectional view of a floating support structure. Floating support 1 comprises a substantially cylindrical main floater 2. Floating support structure 1 also comprises a heave plate 3 fastened to the base of main floater 2. Heave plate 3 has a horizontal section which is always greater than the horizontal section of main floater 2. Heave plate 3 has a substantially truncated cone shape with the horizontal section increasing in depth in a continuous and linear manner between the upper minimum horizontal section and the lower maximum horizontal section. Moreover, heave plate 3 comprises a steel leaf 5 projecting over the entire periphery of the heave plate. Steel leaf 5 is fastened to the base of heave plate 3.

Figure 6:
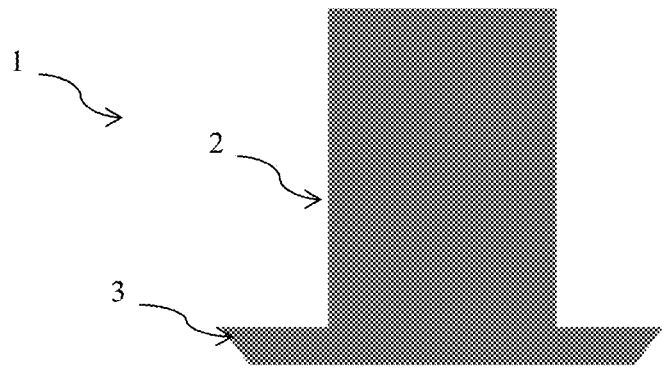
FIG. 6 illustrates a floating support structure according to a fifth embodiment of the invention.

FIG. 6 schematically illustrates, by way of non limitative example, a floating support structure according to a fifth embodiment. FIG. 6 is a sectional view of a floating support structure. Floating support 1 comprises a substantially cylindrical main floater 2. Floating support structure 1 also comprises a heave plate 3 fastened to the base of main floater 2. Heave plate 3 has a horizontal section which is always greater than the horizontal section of main floater 2. Heave plate 3 has a substantially truncated cone shape with the horizontal section decreasing in depth in a continuous and linear manner between the upper maximum horizontal section and the lower minimum horizontal section.

Figure 7:
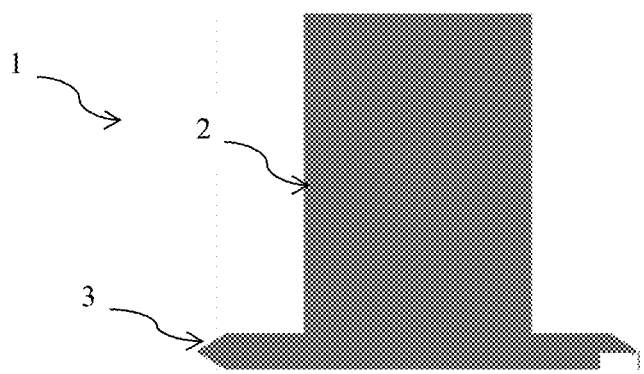
FIG. 7 illustrates a floating support structure according to a sixth embodiment of the invention.

FIG. 7 schematically illustrates, by way of non limitative example, a floating support structure according to a sixth embodiment. FIG. 7 is a sectional view of a floating support structure. Floating support 1 comprises a substantially cylindrical main floater 2. Floating support structure 1 also comprises a heave plate 3 fastened to the base of main floater 2. Heave plate 3 has a horizontal section which is always greater than the horizontal section of main floater 2. The shape of heave plate 3 has two truncated cone-shaped volumes whose sections of greater surface area are juxtaposed. The two truncated cone-shaped volumes preferably have identical dimensions. Thus, the horizontal section of heave plate 3 increases with depth over a first height (corresponding to the upper part of heave plate 3), then it decreases with depth over a second height (corresponding to the lower part of heave plate 3).

The present invention also relates to a wind turbine installation on water (sea for example). The installation comprises a vertical-axis or horizontal-axis wind turbine and a floating support structure according to any one of the variant combinations described above. For example, a horizontal-axis wind turbine is made up of blades, of the rotor, the nacelle and the tower fastened to the floating support structure. The floating support can be anchored to the seabed by taut, semi-taut or catenary anchor lines. The goal of the floating support structure is to provide wind turbine buoyancy and stability so as to take up the stresses exerted thereon and to counterbalance the thrust caused by the wind force while limiting motion of the assembly.

The invention claimed is:

1. A floating support structure comprising a main floater attached to a heave plate, a surface area of horizontal sections of the heave plate being greater than a surface area of horizontal sections of the main floater;
   the horizontal sections varying in cross-sectional area with depth of the heave plate, and a minimum surface area of the horizontal sections always being greater than surface area of horizontal sections of the main floater; and wherein
   variation in the cross-section area of the heave plate is continuous over an entire height of the heave plate.

2. A support structure as claimed in claim 1, wherein a span of the heave plate ranges between 1 and 15 m.

3. A support structure as claimed in claim 2, wherein the span of the heave plate ranges between 3 and 10 m.

4. A support structure as claimed in claim 3, wherein the heave plate comprises at least one truncated cone shape.

5. A support structure as claimed in claim 4, wherein a half angle measured between a vertical and surface of an apex of the cone of the at least one of truncated cone shape ranges between 15° and 60°.

6. A support structure as claimed in claim 2, wherein the heave plate comprises at least one truncated cone shape.

7. A support structure as claimed in claim 6, wherein a half angle measured between a vertical and surface of an apex of the cone of the at least one of truncated cone shape ranges between 15° and 60°.

8. A support structure as claimed in claim 2, wherein a thickness of the heave plate at a periphery of the at least one main floater is at least 1.5 m.

9. A support structure as claimed in claim 1, wherein the heave plate comprises at least one truncated cone shape.

10. A support structure as claimed in claim 9, wherein a half angle measured between a vertical and surface of an apex of the cone of the at least one of truncated cone shape ranges between 15° and 60°.

11. A support structure as claimed in claim 10, wherein a thickness of the heave plate at a periphery of the at least one main floater is at least 1.5 m.

12. A support structure as claimed in claim 9, wherein a thickness of the heave plate at a periphery of the at least one main floater is at least 1.5 m.

13. A support structure as claimed in claim 1, wherein a thickness of the heave plate at a periphery of the at least one main floater is at least 1.5 m.

14. A support structure as claimed in claim 1, wherein the heave plate comprises at least one notch and projections evenly distributed over a periphery thereof.

15. A support structure as claimed in claim 14, wherein the at least one notch and the projections are rectangular.

16. A support structure as claimed in claim 1, wherein the heave plate comprises a leaf in the lower part thereof.

17. A support structure as claimed in claim 1, wherein the heave plate is fastened to a base of the at least one main floater.

18. A support structure as claimed in claim 1, wherein the horizontal section increases with depth.

19. A support structure as claimed in claim 1, wherein the horizontal section decreases with depth.

20. A support structure as claimed in claim 1, wherein the horizontal section increases and then decreases with depth.

21. A support structure as claimed in claim 1, wherein the heave plate comprises one of steel or concrete.

22. A support structure as claimed in claim 1, wherein the heave plate comprises one of a circular, hexagonal and square horizontal section.

23. An offshore wind turbine comprising a wind turbine and a floating support structure as claimed in claim 1.

* * * * *